(12) United States Patent
Won et al.

(10) Patent No.: US 12,066,740 B2
(45) Date of Patent: Aug. 20, 2024

(54) META-OPTICAL DEVICE HAVING VARIABLE PERFORMANCE AND ELECTRONIC DEVICE INCLUDING THE SAME

(71) Applicants: SAMSUNG ELECTRONICS CO., LTD., Suwon-si (KR); Cornell University, Ithaca, NY (US)

(72) Inventors: Kanghee Won, Seoul (KR); Maxim Radikovich Shcherbakov, Ithaca, NY (US); Hongseok Lee, Seoul (KR); Melissa Bosch, Ithaca, NY (US); Gennady Shvets, Ithaca, NY (US)

(73) Assignees: SAMSUNG ELECTRONICS CO., LTD., Suwon-si (KR); Cornell University, Ithaca, NY (US)

( * ) Notice: Subject to any disclaimer, the term of this patent is extended or adjusted under 35 U.S.C. 154(b) by 226 days.

(21) Appl. No.: 17/552,139

(22) Filed: Dec. 15, 2021

(65) Prior Publication Data

US 2022/0187677 A1 Jun. 16, 2022

Related U.S. Application Data

(60) Provisional application No. 63/126,131, filed on Dec. 16, 2020.

(30) Foreign Application Priority Data

Jul. 13, 2021 (KR) .......................... 10-2021-0091853

(51) Int. Cl.
*G02F 1/29* (2006.01)
*H04N 23/67* (2023.01)

(52) U.S. Cl.
CPC .......... *G02F 1/294* (2021.01); *G02F 2202/30* (2013.01); *G02F 2202/36* (2013.01); *G02F 2203/50* (2013.01); *H04N 23/67* (2023.01)

(58) Field of Classification Search
CPC .. G02F 1/294; G02F 2202/30; G02F 2202/36; G02F 2202/50
See application file for complete search history.

(56) References Cited

U.S. PATENT DOCUMENTS

| 4,190,330 A | 2/1980 | Berreman |
| 10,684,505 B2 | 6/2020 | Nam et al. |
| 2018/0216797 A1 | 8/2018 | Khorasaninejad et al. |

FOREIGN PATENT DOCUMENTS

| CN | 108873555 A | | 11/2018 |
| CN | 110865475 A | | 3/2020 |
| CN | 112147817 A | * | 12/2020 |
| KR | 10-2017-0084949 A | | 7/2017 |
| KR | 10-1979886 B1 | | 5/2019 |

OTHER PUBLICATIONS

Espacenet English machine translation of CN112147817A (Year: 2020).*

(Continued)

*Primary Examiner* — Dung T Nguyen
*Assistant Examiner* — David Y Chung
(74) *Attorney, Agent, or Firm* — Sughrue Mion, PLLC

(57) ABSTRACT

A meta-optical device, which imparts a phase delay to incident light of a wavelength band, includes: a first electrode and a second electrode spaced apart from each other; a liquid crystal layer between the first electrode and the second electrode; a meta-surface layer located within the liquid crystal layer and including a plurality of nanostructures each having a shape dimension smaller than a center wavelength of the wavelength band; and a voltage device configured to apply a voltage between the first electrode and the second electrode. The meta-optical device may exhibit an electrically controlled variable focal length.

24 Claims, 14 Drawing Sheets

(56) References Cited

OTHER PUBLICATIONS

Espacenet English machine translation of CN110865475A (Year: 2020).*
Yu, et al., "Flat optics with designer metasurfaces", 2014, Nature Materials, vol. 13, 12 pages total.
Lin, et al., "Dielectric gradient metasurface optical elements", 2014, Science Mag, vol. 345, Issue 6194, 6 pages total, https://www.science.org/doi/10.1126/science.1253213.
Shen, et al., "Liquid crystal integrated metalens with tunable chromatic aberration", 2020, Advanced Photonics, vol. 2, Issue 3, 7 pages total.
Li, et al., "Switchable electro-optic diffractive lens with high efficiency for ophthalmic applications", 2006, Proceedings of the National Academy of Sciences of the United States of America, vol. 103, Issue 16, 5 pages total, www.pnas.org/cgi/doi/10.1073/pnas.0600850103.
Hong, et al., "Flat metaform near-eye visor", 2017, Applied Optics, vol. 56, Issue 31, 6 pages total, https://doi.org/10.1364/AO.56.008822.
Zhou, et al., "Liquid crystal integrated metalens with dynamic focusing property", Jul. 30, 2020, Optics Letters, vol. 45, Issue 15, 5 pages total.
Komar et al., "Electrically tunable all-dielectric optical metasurfaces based on liquid crystals", Feb. 15, 2017, Applied Physics Letters, vol. 110, 4 pages total, XP 012216354.
Communication issued May 13, 2022 by the European Patent Office for European Patent Application No. 21213203.9.

* cited by examiner

META-OPTICAL DEVICE HAVING VARIABLE PERFORMANCE AND ELECTRONIC DEVICE INCLUDING THE SAME

CROSS-REFERENCE TO RELATED APPLICATIONS

This application is based on and claims priority under 35 U.S.C. § 119 to U.S. Provisional Patent Application No. 63/126,131, filed on Dec. 16, 2020, in the United States Patent and Trademark Office, and Korean Patent Application No. 10-2021-0091853, filed on Jul. 13, 2021, in the Korean Intellectual Property Office, the disclosures of which are incorporated by reference herein in their entirety.

BACKGROUND

1. Field

Embodiments disclosed herein relate to a meta-optical device having variable optical performance and an electronic device including the same.

2. Description of the Related Art

Flat plate-type diffractive elements utilizing a meta-structure are in the spotlight in many fields because they may exhibit various optical effects that cannot be realized by existing refractive elements and may implement a thin optical system.

The meta-structure has a nanostructure in which a dimension smaller than the wavelength of incident light is applied to a shape, a period, and the like, and the nanostructure is designed such that a phase delay profile, which is set for each position with respect to light of a preferred wavelength band, is satisfied in order to realize preferred optical performance, for example, a function of a lens.

A meta-lens designed as described above may have a thickness less than that of existing refractive lenses, and thus may be preferred for a subminiature optical system. Meanwhile, since a meta-lens is generally a passive device having fixed optical performance, a method of implementing a structure capable of varying performance has been sought.

SUMMARY

Provided is a meta-optical device having variable optical performance.

Provided is an electronic device utilizing a meta-optical device.

Additional aspects will be set forth in part in the description which follows and, in part, will be apparent from the description, or may be learned by practice of embodiments of the disclosure.

In accordance with an aspect of the disclosure, a meta-optical device which imparts a phase delay to incident light of a wavelength band includes a first electrode and a second electrode spaced apart from each other; a liquid crystal layer between the first electrode and the second electrode; a meta-surface layer located within the liquid crystal layer, the meta-surface layer including a plurality of nanostructures each having a shape dimension smaller than a center wavelength of the wavelength band; and a voltage device configured to apply a voltage between the first electrode and the second electrode.

An angle between a major axis of liquid crystal molecules in the liquid crystal layer and a first direction parallel to the meta-surface layer may increase according to the voltage applied between the first electrode and the second electrode.

The meta-optical device may exhibit a first focal length when the angle is 0°, and may exhibit a second focal length shorter than the first focal length, when the angle is 90°.

The meta-optical device may exhibit a third focal length shorter than the first focal length and longer than the second focal length, when the angle is between 0° and 90°.

A focal length of the meta-optical device may be gradually reduced as the angle increases from 0° up to 90°.

A phase φ of the meta-optical device for each of angles 0°, $\theta_1$, $\theta_2$, $\theta_3$, and 90° between the major axis of the liquid crystal molecules and the first direction, may satisfy the following condition:

$$\varphi(90°) < \varphi(\theta_3) < \varphi(\theta_2) < \varphi(\theta_1) < \varphi(0°)$$

(here, $0° < \theta_1 < \theta_2 < \theta_3 < 90°$).

The meta-optical device may satisfy the following condition:

$$\phi < 1.5 \text{ radian}$$

(here, φ is defined as follows:)

$$\Phi = \sum_{i=1}^{4} \frac{|\Delta\Phi_i - \text{mean}(\Delta\Phi_i)|}{4}$$

$$\Delta\Phi_1 = \phi(90°) - \phi(67°), \Delta\Phi_2 = \phi(67°) - \phi(45°)$$

$$\Delta\Phi_3 = \phi(45°) - \phi(22°), \Delta\Phi_4 = \phi(22°) - \phi(0°).$$

Each of the plurality of nanostructures may include a quadrangular prism in which at least one side is parallel to the first direction.

The meta-surface layer may include a plurality of unit cells, and each of the plurality of unit cells may include a pair of a first nanostructure of the plurality of nanostructures and a second nanostructure of the plurality of nanostructures.

When viewed from a cross-section parallel to the meta-surface layer, the first nanostructure and the second nanostructure may each have a rectangular shape having a width parallel to the first direction and a length parallel to a second direction perpendicular to the first direction.

A focal length may be f1 when the angle is 0°, and the focal length may be f1/2 when the angle is 90°.

A focal length may be f1 when the angle is 0°, and the focal length may be −f1 when the angle is 90°.

The meta-surface layer may include a plurality of phase modulation regions, wherein a phase modulation range of each phase modulation region of the plurality of phase modulation regions is equal to the phase modulation range of each other phase modulation region of the plurality of phase modulation regions, and wherein each of the plurality of phase modulation regions includes a plurality of sub-zones.

The phase modulation range may be 2π, a number of the plurality of sub-zones in each of the plurality of phase modulation regions may be n, and a phase modulation interval of each of the plurality of sub-zones may be 2π/n.

Each of the plurality of sub-zones may include at least one nanostructure having a shape dimension unique to the corresponding sub-zone.

A height of each of the plurality of nanostructures may be in a range of about $0.4\lambda_0$ to about $1.5\lambda_0$, where the center wavelength of the wavelength band is $\lambda_0$.

A numerical aperture of the meta-optical device may be greater than 0.3.

The plurality of nanostructures may include a material having a refractive index greater than a refractive index of the liquid crystal layer.

The plurality of nanostructures may include amorphous silicon (a-Si), crystalline silicon (c-Si), GaP, or $TiO_2$.

The wavelength band may include an infrared wavelength band or a visible wavelength band.

Each of the plurality of nanostructures may have a polygonal prism shape, a circular cylindrical shape, or an elliptical cylindrical shape.

An electronic device may include an image forming optical system; and a variable focus optical system configured to adjust a position on which image light generated by the image forming optical system is focused, the variable focus optical system including the meta-optical device of an above-noted aspect of the disclosure.

The electronic device may include an optical combiner configured to combine ambient light with the image light and provide the combined light to a user.

An electronic device may include an imaging lens assembly including the meta-optical device of an above-noted aspect of the disclosure; and an image sensor configured to convert an optical image formed by the imaging lens assembly into an electrical signal.

In accordance with an aspect of the disclosure, a meta-optical device includes a liquid crystal layer; and a meta-surface layer, wherein a focal depth of focused light exiting the meta-optical device depends on a magnitude of a voltage applied uniformly to the liquid crystal layer.

The liquid crystal layer may include liquid crystal molecules oriented in a first direction parallel to each other when a first voltage is applied uniformly to the liquid crystal layer, and the liquid crystal molecules may be oriented in a second direction parallel to each other, different from the first direction, when a second voltage different from the first voltage is applied uniformly to the liquid crystal layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
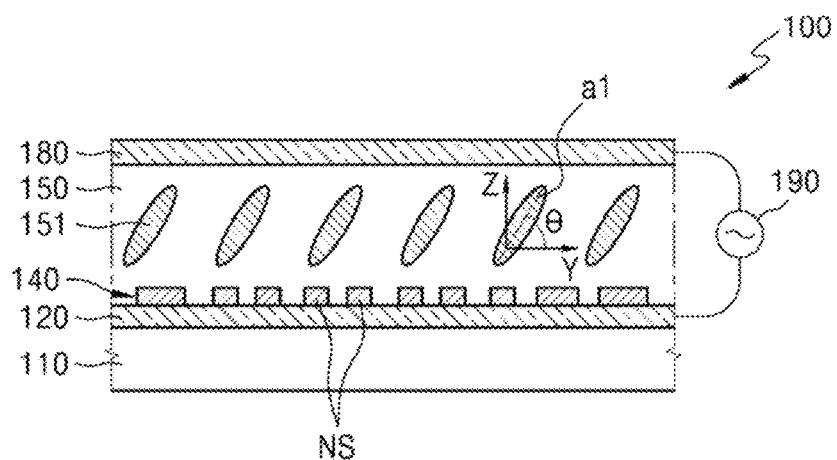
FIG. 1 is a cross-sectional view illustrating a schematic structure of a meta-optical device according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. The described embodiments are merely examples, and various modifications are possible from these embodiments. In the following drawings, like reference numerals refer to like elements, and sizes of elements in the drawings may be exaggerated for clarity and convenience of description.

An expression "above" or "on" used herein may include not only "immediately on in a contact manner" but also "on in a non-contact manner".

Terms such as "first" or "second" may be used to describe various elements, but the elements should not be limited by the terms. The terms do not define that the elements have different materials or structures from each other.

An expression used in the singular encompasses the expression of the plural, unless it has a clearly different meaning in the context. In addition, when an element "includes" or "comprises" another element, unless there is a particular description contrary thereto, the element can further include other elements, not excluding the other elements.

Also, the terms used herein, such as " . . . er (or)", " . . . unit", " . . . module", etc., denote a unit that performs at least one function or operation, which may be implemented as hardware or software or a combination thereof.

The term "the" and other demonstratives similar thereto should be understood to include a singular form and plural forms.

The operations of a method can be performed in any suitable order unless otherwise indicated herein or otherwise clearly contradicted by context. In addition, all example terms (e.g., "such as" or "etc.") are used for the purpose of description and are not intended to limit the scope of the disclosure unless defined by the claims.

Figure 2:
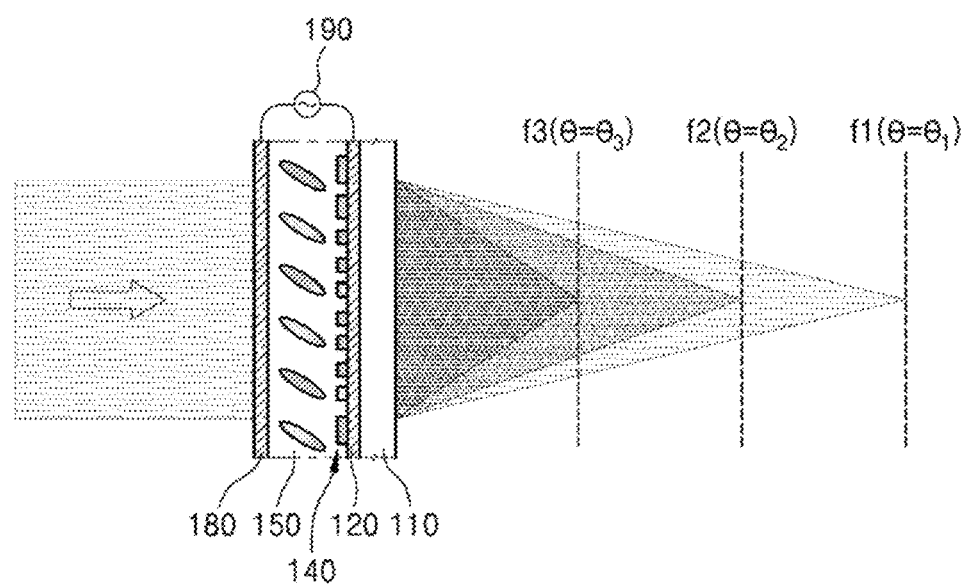
FIG. 2 is a conceptual diagram illustrating variation of a focal length performed by a meta-optical device according to an embodiment.

FIG. 1 is a cross-sectional view illustrating a schematic structure of a meta-optical device 100 according to an embodiment, and FIG. 2 is a conceptual diagram illustrating example variation of a focal length performed by the meta-optical device according to an embodiment.

The meta-optical device 100 includes a first electrode 120 and a second electrode 180 spaced apart from each other, a meta-surface layer 140, and a voltage device 190 configured to apply a voltage between the first electrode 120 and the second electrode 180. The first electrode 120 may be on a substrate 110. The meta-surface layer 140 is in a liquid crystal layer 150 between the first electrode 120 and the second electrode 180 and includes a plurality of nanostructures NS.

The meta-optical device 100 includes the meta-surface layer 140 that imparts a phase delay to incident light of a certain wavelength band (e.g., a wavelength band). The nanostructures NS constituting the meta-surface layer 140 may have a refractive index different from that of the surrounding materials, and may have a shape dimension of a sub-wavelength, e.g., a shape dimension smaller than a center wavelength $\lambda_0$ of the certain wavelength band. The certain wavelength band may include an infrared wavelength band or a visible wavelength band. The nanostructures NS may have various shapes such as a polygonal prism shape, a circular cylindrical shape, an elliptical cylindrical shape, and the like. The height of the nanostructures NS may be in a range of about $0.4\lambda_0$ to about $1.5\lambda_0$.

The liquid crystal layer 150 exhibits optical anisotropy. Liquid crystal molecules 151 constituting the liquid crystal layer 150 exhibit birefringence that exhibits a refractive index that depends on the polarization direction of incident light. The liquid crystal layer 150 exhibits a refractive index with respect to light which is polarized in a direction parallel to a major axis al of the liquid crystal molecules 151 (e.g., the extraordinary refractive index), and a different refractive index with respect to light which is polarized in a direction perpendicular to the major axis al (e.g., the ordinary refractive index). Meanwhile, the liquid crystal molecules 151 rotate in response to an electric field applied thereto. The direction of the major axis al of the liquid crystal molecules 151 is changed according to an electric field applied to the liquid crystal layer 150, which means that the birefringence of the liquid crystal layer 150 is adjusted according to a voltage applied acro.g.ss the liquid crystal layer 150.

Light incident on the meta-surface layer 140 encounters a refractive index distribution determined by the shape and configuration of the plurality of nanostructures NS having a refractive index different from that of surrounding materials. The shapes of wavefronts connecting points of the same phase to each other in the propagation path of light before and after undergoing such a refractive index distribution are different, and this is referred to as a phase delay. The degree of the phase delay varies depending on the position which is a variable of the refractive index distribution. In other words, the degree of the phase delay varies depending on x and y coordinates on a plane perpendicular to the propagation direction of light (Z direction or −Z direction as shown, e.g., in FIG. 1) at a position immediately after the light incident on the meta-surface layer 140 passes through the meta-surface layer 140. As such, the phase of the light after passing through the meta-surface layer 140 exhibits a phase different from the phase at the time of incidence.

The optical performance of the meta-surface layer 140 is set according to a phase delay profile. In the embodiment, the meta-surface layer 140 may be set to function as a lens and the liquid crystal layer 150 having variable birefringence is employed, and thus the meta-optical device 100 may function as a variable focus lens by the liquid crystal layer 150 and the meta-surface layer 140. In other words, the meta-optical device 100 according to the embodiment may exhibit a phase delay profile that is determined by the phase delay characteristic exhibited according to the shape distribution of the sub-wavelength nanostructures NS constituting the meta-surface layer 140 and the variable birefringence exhibited by the liquid crystal layer 150 according to a voltage applied thereto. In addition, when the phase delay profile that is electrically adjusted corresponds to a variable focal length, the meta-optical device 100 may function as a variable focus lens.

However, the embodiment is not limited thereto, and the phase delay profile may be set such that the meta-surface layer 140 exhibits different optical performance, e.g., the shapes and sizes of the nanostructures, and a configuration related thereto may be set. The meta-surface layer 140 may function as, for example, a mirror, a beam deflector, or a beam shaper, and the meta-optical device 100 may function as an optical device having variable performance together with the variable birefringence exhibited by the liquid crystal layer 150.

Hereinafter, the terms "phase", "phase delay", and "phase modulation" refer to a phase after light passes through the meta-optical device 100, and refer to a relative phase value with respect to a phase immediately before the light is incident on the meta-optical device 100, and the terms may be used interchangeably.

The nanostructures NS may be formed of a material having a refractive index greater than that of the surrounding materials, and may be formed of a dielectric material having a refractive index greater than that of the liquid crystal layer 150. For example, the nanostructures NS may have a refractive index greater than the extraordinary refractive index exhibited by the liquid crystal layer 150. The nanostructures NS may include at least one of crystalline silicon (e.g., c-Si and p-Si), amorphous silicon (e.g., a-Si), a group III-V compound semiconductor (e.g., GaAs, GaP, GaN, and GaAs), SiC, $TiO_2$, SiN, or a combination thereof.

The first electrode 120 and the second electrode 180 may be formed of a transparent conductive oxide (TCO) such as indium tin oxide (ITO), indium zinc oxide (IZO), aluminum zinc oxide (AZO), or gallium zinc oxide (GZO).

The substrate 110 may be formed of various materials having optically transparent properties, and may include, for example, $SiO_2$, glass, and a transparent plastic material.

In the initial alignment state of the liquid crystal molecules 151, an angle θ between the major axis al of the liquid crystal molecules 151 and a first direction (y direction) on the meta-surface layer 140 may be 0°. That is, the first direction may be defined as the major-axis direction of the liquid crystal molecules 151 in the initial alignment state. As a voltage applied between the first electrode 120 and the second electrode 180 increases, the angle θ may increase. A state in which the angle θ is 0° may be referred to as an off state, but this state is not limited to the state in which the voltage applied between the first electrode 120 and the second electrode 180 is 0. No voltage may be applied between the first electrode 120 and the second electrode 180, or a preset bias voltage may be applied therebetween to configure an initial state in which the angle θ is 0°.

The angle θ may be increased according to the voltage applied between the first electrode 120 and the second electrode 180, and the angle θ may be changed in a range between 0° and 90°. The focal length when the angle θ is 90° may be less than the focal length when the angle θ is 0°. Also, when the angle θ is greater than 0° and less than 90°, a focal length between the two focal lengths when the angle θ is 90° and 0° may be obtained. As the angle θ increases from 0° up to 90°, the focal length of the meta-optical device 100 may gradually decrease. As illustrated in FIG. 2, focal lengths f1, f2, f3 respectively corresponding to three angles $\theta_1$, $\theta_2$, $\theta_3$ satisfying $0°<\theta_1<\theta_2<\theta_3<90°$ satisfy a relationship of f1>f2>f3.

The shape and size of the nanostructures NS provided at each position of the meta-surface layer 140 are set so as to implement the variable focal length, and a design method thereof will be described with reference to FIGS. 3 to 7.

Figure 3:
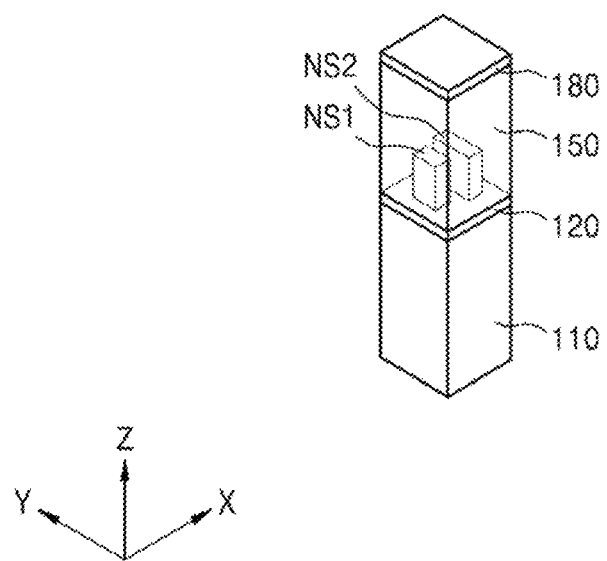
FIG. 3 is a perspective view illustrating a shape of a unit cell constituting a meta-optical device according to an embodiment.
Figure 4:
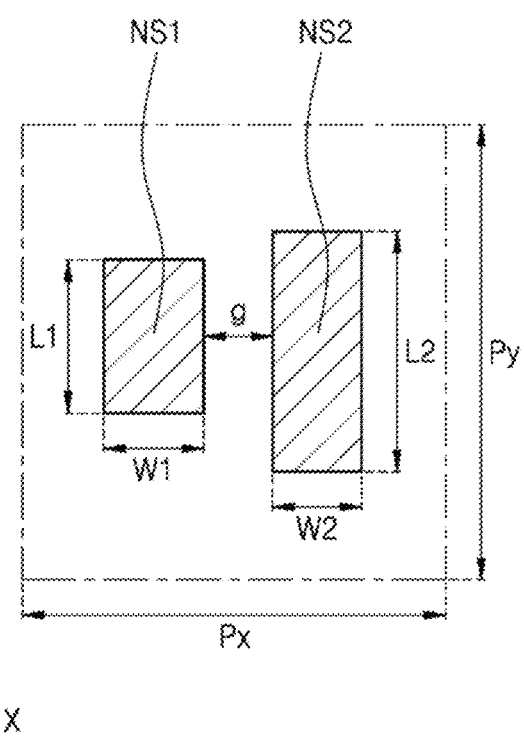
FIG. 4 is a plan view illustrating shape variables constituting the unit cell of FIG. 3.

FIG. 3 is a perspective view illustrating a shape of a unit cell constituting a meta-optical device according to an embodiment, and FIG. 4 is a plan view illustrating shape variables constituting the unit cell of FIG. 3.

Referring to FIGS. 3 and 4, the unit cell may include two nanostructures NS1 and NS2 constituting a pair. The two nanostructures NS1 and NS2 may have a quadrangular prism shape having at least one side parallel to the first direction (y direction). The cross-section of the unit cell as seen in the z direction may have a rectangular shape having a width of Px and a length of Py, a gap between the two nanostructures may be g, the nanostructure NS1 may have a rectangular cross-section shape having a width of W1 and a length of L1, and the nanostructure NS2 may have a rectangular cross-section shape having a width of W2 and a length of L2. The variables Px, Py, g, W1, W2, L1, and L2 of the unit cell may be set such that an appropriate phase is implemented at each position of the meta-surface layer 140, i.e., at each position on the plane perpendicular to the propagation direction of light.

Figure 5:
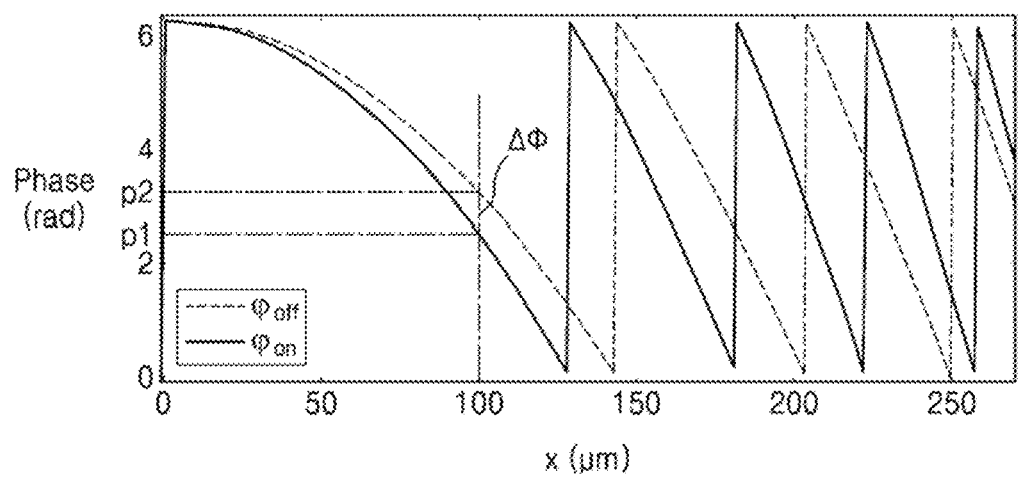
FIG. 5 illustrates two example types of phase delay profiles that may exhibit different focal lengths.
Figure 6:
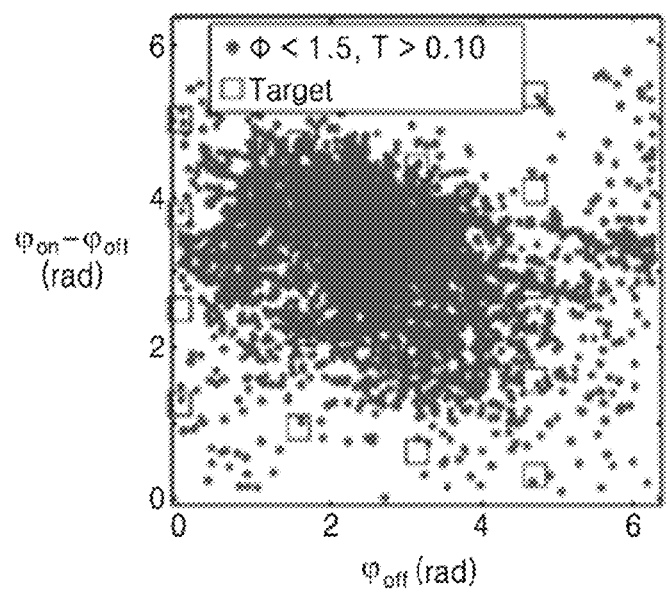
FIG. 6 is a diagram showing a distribution of phase characteristics according to the shape variables of the unit cell of FIG. 4.

FIG. 5 illustrates two example types of phase delay profiles that may exhibit different focal lengths. FIG. 6 is a diagram showing a distribution of phase characteristics according to the shape variables of the unit cell of FIG. 4.

The graph of two phase profiles $\varphi_{off}$ and $\varphi_{on}$ illustrated in FIG. 5 shows phase profiles representing different focal lengths, and is based on Equation 1.

$$\phi(r, f) = \frac{2\pi}{\lambda}(f - \sqrt{r^2 + f^2})$$ [Equation 1]

In Equation 1, φ(r, f) represents the phase that can achieve the focal length f as a function of a distance r from the center of a lens.

The above equation may be applied to be satisfied within a region in which a lens region is divided into a plurality of Fresnel zones. The phase is reset at the start point of the region, and the phase in each region satisfies a condition of 0<φ<2π. In the graph illustrated in FIG. 5, $\varphi_{off}$ represents a focal length of 15 mm and $\varphi_{on}$ represents a focal length of 12 mm. When the meta-optical device 100 according to the embodiment implements the illustrated two phases $\varphi_{off}$ and $\varphi_{on}$ according to whether a voltage is applied or not, two focal lengths may be implemented.

In order to satisfy such requirements, the respective shape variables illustrated in FIG. 4 with respect to each of the nanostructures NS included in the meta-surface layer 140 may be set to achieve appropriate Δφ for each position. For example, at a position of x=100 μm on the graph, the variables of the nanostructure NS at the position may be set to achieve a phase value of p2 when no voltage is applied to the meta-optical device 100, and a phase value of p1 when a preset voltage is applied to the meta-optical device 100.

FIG. 6 illustrates the distribution represented in a phase space based on a computer simulation result of phase delay characteristics according to various shape dimensions of the nanostructures NS, in which the horizontal axis represents phase $\varphi_{off}$ and the vertical axis represents a difference between phases $\varphi_{on}-\varphi_{off}$. From the graph, target nanostructures that may be matched with the graph of FIG. 5 may be selected. In addition to phase requirements, a condition of a transmittance (T) and a requirement of φ related to phase uniformity, which will be described below, may be further considered in selecting the targets.

The meta-optical device 100 according to the embodiment may satisfy the following condition so as to implement a focal length that continuously varies as the angle of the major axis of the liquid crystal molecule 151 is changed between 0° and 90° according to the applied voltage.

φ(90°)<φ($\theta_3$)<φ($\theta_2$)<φ($\theta_1$)<φ(0°)

Here, $0°<\theta_1<\theta_2<\theta_3<90°$

The parameter ϕ may be defined such that the phase value according to the angle θ is as linear as possible, as Equation 2.

$$\Phi = \sum_{i=1}^{4} \frac{|\Delta\Phi_i - \text{mean}(\Delta\Phi_i)|}{4}$$ [Equation 2]

$\Delta\Phi_1 = \phi(90°) - \phi(67°)$, $\Delta\Phi_2 = \phi(67°) - \phi(45°)$ $\Delta\Phi_3 = \phi(45°) - \phi(22°)$, $\Delta\Phi_4 = \phi(22°) - \phi(0°)$ The above parameter ϕ defined from the phase values in five cases where the angle of rotation of the major axis of the liquid crystal molecule 151 is 0°, 22°, 45°, 67°, and 90° may satisfy the following requirement to ensure that the phase value according to the angle θ is as linear as possible.

ϕ<1.5 radian

The nanostructures NS having the selected design values as described above are arranged to occupy respective positions of the meta-surface layer 140.

Figure 7:
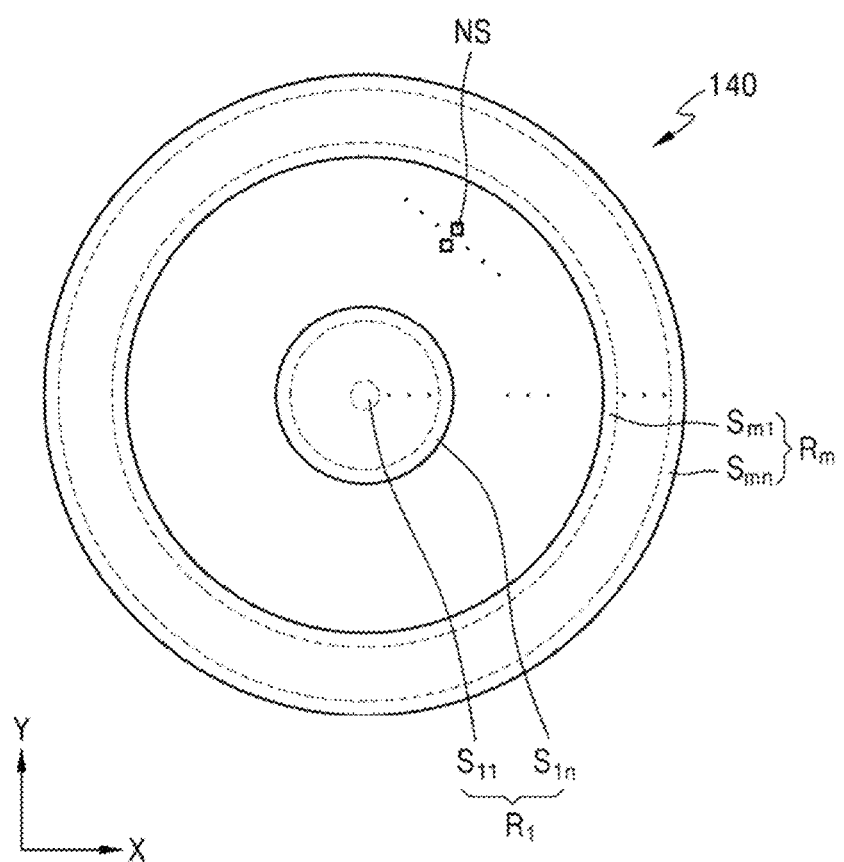
FIG. 7 is a plan view illustrating a region structure of a meta-surface layer included in a meta-optical device according to an embodiment.

FIG. 7 is a plan view illustrating a region structure of the meta-surface layer 140 included in the meta-optical device according to an embodiment.

The meta-surface layer 140 may be divided into a plurality of phase modulation regions R1 to Rm each representing the same phase modulation range. The plurality of phase modulation regions $R_1$ to $R_m$ are Fresnel zones representing a phase modulation range of 0 to 2 π described in Equation 1. Each of the Fresnel zones may be divided into a plurality of sub-zones. For example, the phase modulation region $R_1$ includes a plurality of sub-zones $S_{11}$ to $S_{1n}$, and the phase modulation region $R_m$ includes a plurality of sub-zones $S_{m1}$ to $S_{mn}$. When m phase modulation regions are divided into n sub-zones, a phase modulation interval of each of the sub-zones is 2π/n. In each sub-zone $S_{ij}$ (1≤i≤m, 1≤j≤n), the nanostructure NS having a shape dimension determined to satisfy a phase condition, $0<\varphi_{ij}<2\pi/n$, may be arranged. In each sub-zone $S_{ij}$ (1≤i≤m, 1≤j≤n), at least one nanostructure NS having a shape dimension unique to the corresponding sub-zone may be arranged.

Figure 8:
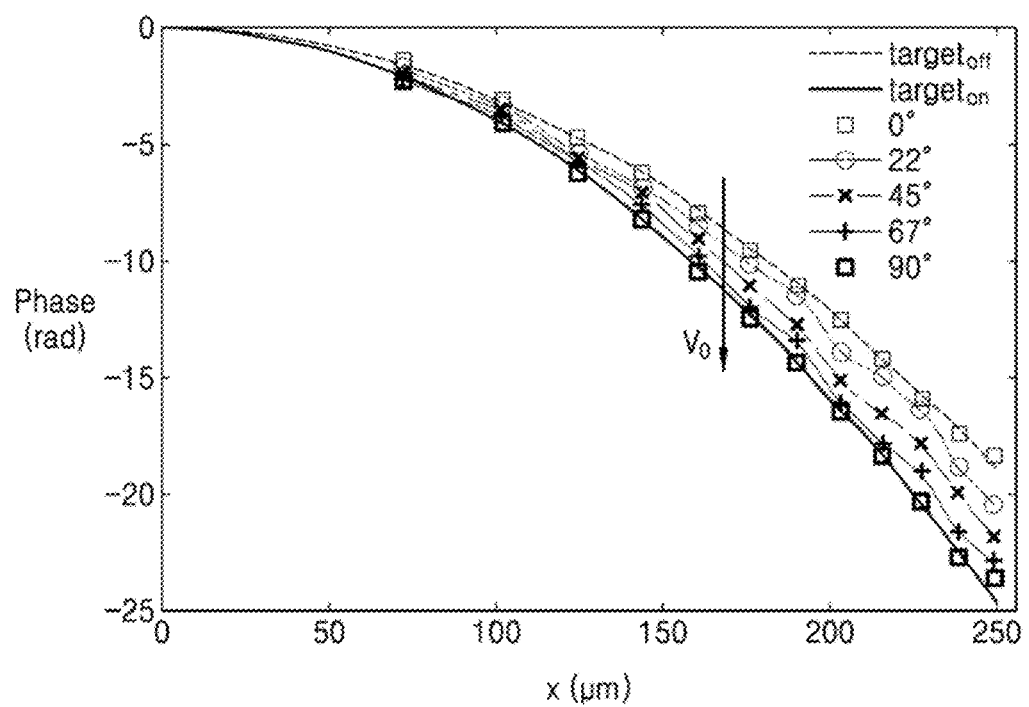
FIG. 8 is a graph showing a phase delay profile that varies depending on an applied voltage to a meta-optical device according to an embodiment.
Figure 9:
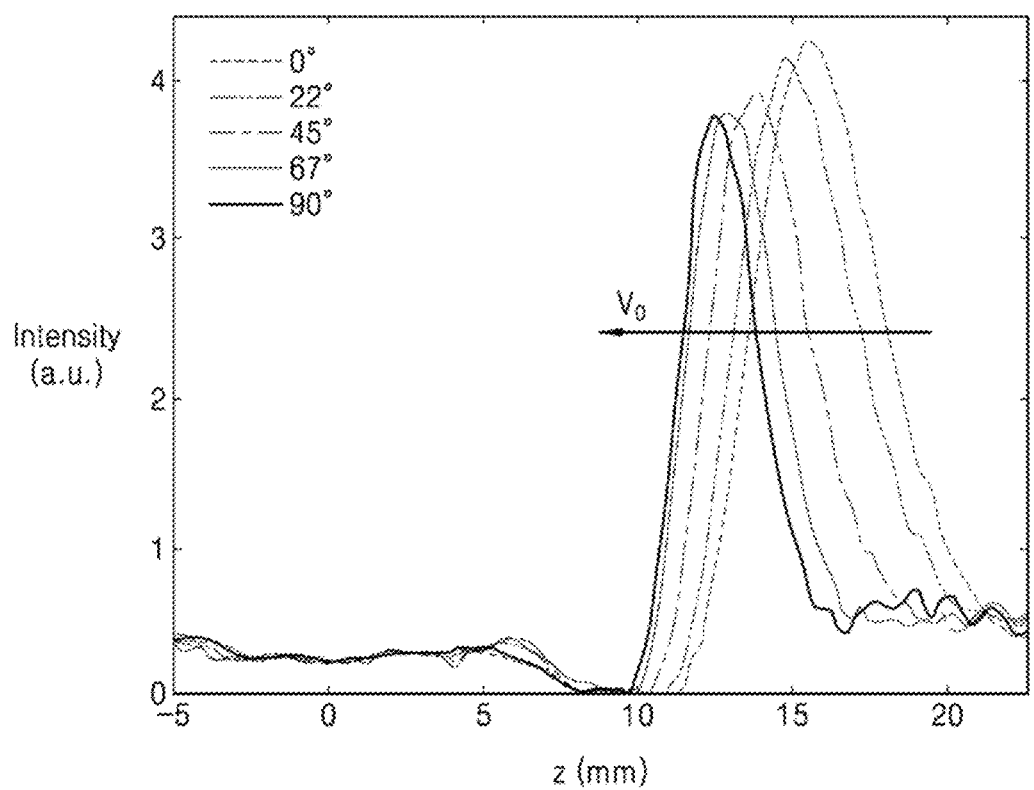
FIG. 9 is a graph showing a focusing distribution, which varies depending on an applied voltage to a meta-optical device according to an embodiment.
Figure 10:
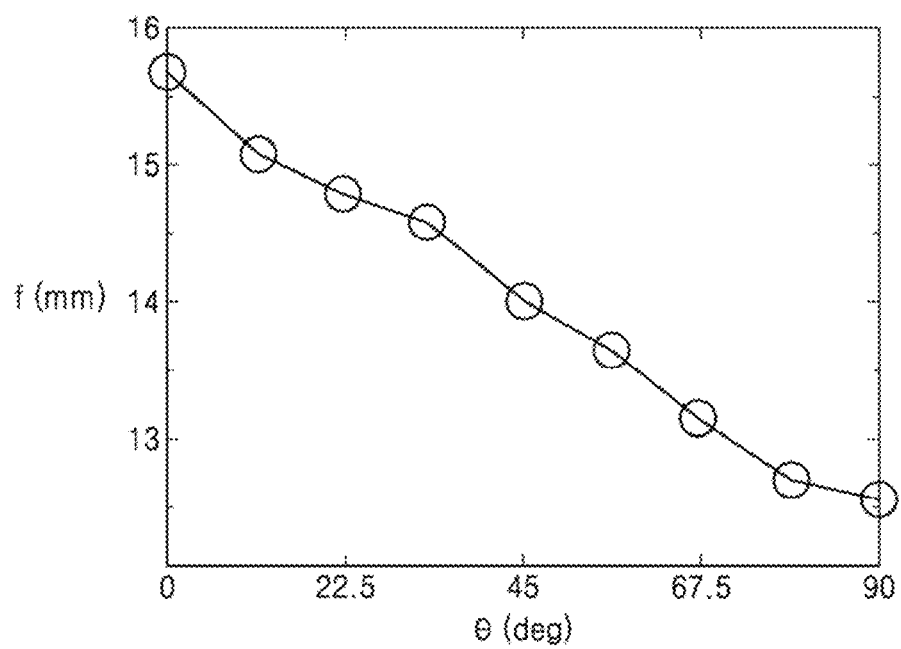
FIG. 10 is a graph showing a focal length, which varies depending on an applied voltage, implemented by a meta-optical device according to an embodiment.

FIG. 8 to FIG. 10 are graphs showing a result of computer simulation of variation of a focal length performed by the meta-optical device according to an embodiment.

Detailed materials and shape dimensions of the meta-optical device 100 used in the computer simulation will be described.

The substrate 110 is formed of $SiO_2$, the first electrode 120 and the second electrode 180 are formed of ITO, the nanostructures NS are formed of aSi, and the liquid crystal layer 150 is formed of a nematic liquid crystal having an extraordinary refractive index $n_e$ of 1.72 and an ordinary refractive index $n_o$ of 1.51.

The meta-surface layer 140 is divided into three Fresnel zones, and each Fresnel zone is divided into twelve sub-zones. The shape of each of the nanostructures NS arranged in the sub-zone $S_{ij}$ is set such that the phase at each position satisfies the following condition.

$$\varphi_{ij}(\theta=0°) \cong \varphi(r, f_{off})$$

$$\varphi_{ij}(\theta=90°) \cong \varphi(r, f_{on})$$

Here, $f_{off}$ is a focal length when no voltage is applied, and $f_{on}$ is a focal lengths when a maximum voltage Vmax is applied. For example, $f_{off}$ and $f_{on}$ may be 15 mm and 12 mm, respectively.

FIG. 8 is a graph showing phase delay profiles according to an applied voltage of the meta-optical device according to an embodiment.

In the graph, the dotted line of $target_{off}$ and the solid line of $target_{on}$ represents theoretical phase profiles that may implement the two focal lengths, $f_{off}$ and $f_{on}$, and phase values for respective positions according to the angle between the major axis of the liquid crystal molecule 151 and the initial direction are represented by performing computer simulation.

The voltage applied between the first electrode 120 and the second electrode 180 is an AC voltage having an amplitude $V_0$, and as $V_0$ increases, the angle of rotation of the liquid crystal molecule 151 is changed to 22°, 45°, 67°, and 90°, respectively. The effective refractive index of the liquid crystal layer 150 is changed according to the angle of rotation of the liquid crystal molecule 151, and the phase at each position of the meta-optical device 100 is also changed. The phase is gradually changed according to a change of the angle.

FIG. 9 is a graph showing a focusing distribution, which varies depending on an applied voltage, implemented by the meta-optical device according to an embodiment, and FIG. 10 is a graph showing a focal length, which varies depending on an applied voltage, with respect to the angle of rotation of the major axis of the liquid crystal molecule implemented by the meta-optical device according to an embodiment.

Referring to FIG. 9, it may be found that the position in the Z direction, at which the intensity of light is the maximum, gradually changes according to a change in $V_0$. A focal length may be extracted from the position where the intensity of light is the maximum value illustrated in FIG. 9, and this is also applicable to FIG. 10. The focal length is about 15.5 mm when the angle of rotation of the major axis of the liquid crystal molecule is 0°, e.g., when the applied voltage is 0, and is about 12.5 mm when the angle of rotation of the major axis of the liquid crystal molecule is 90°, e.g., when the applied voltage is Vmax. This is significantly similar to the target focal lengths, $f_{off}$, which is 15 mm, and $f_{on}$, which is 12 mm, and it may be found that a variable focal length that varies almost linearly between the two focal lengths is implemented.

The focusing efficiency is 12.1% when the angle of rotation of the liquid crystal molecule is 0°, and is 13.6% when the angle of rotation of the liquid crystal molecule is 90°, and the Strehl ratio representing the diffraction efficiency was calculated to be about 0.72 to about 0.83 for all five angles, and it may be evaluated as exhibiting near-diffraction limited focusing performance.

Figure 11:
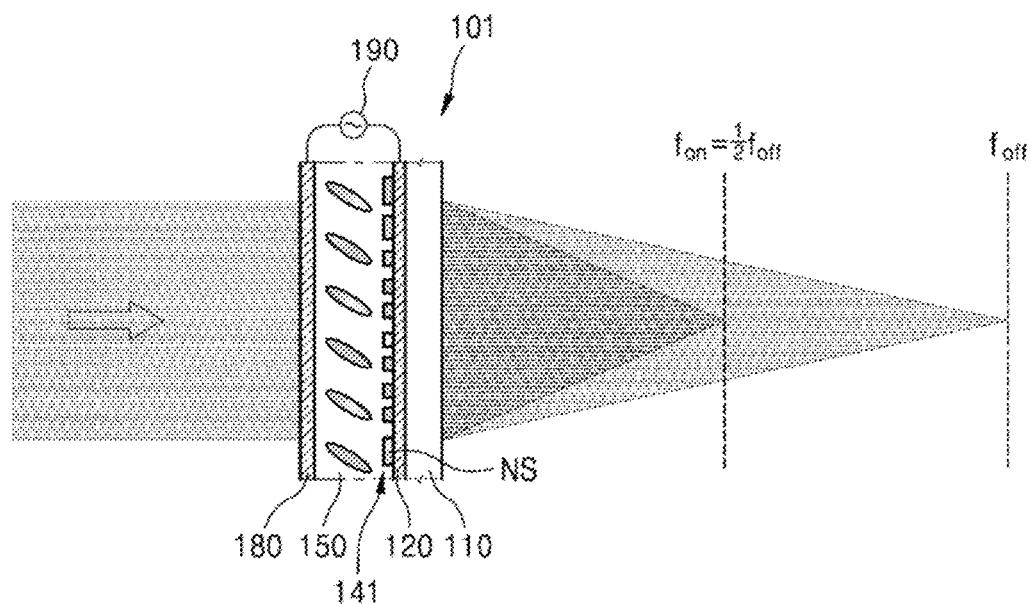
FIG. 11 is a conceptual diagram illustrating a schematic structure and a function of a meta-optical device according to an embodiment.
Figure 12:
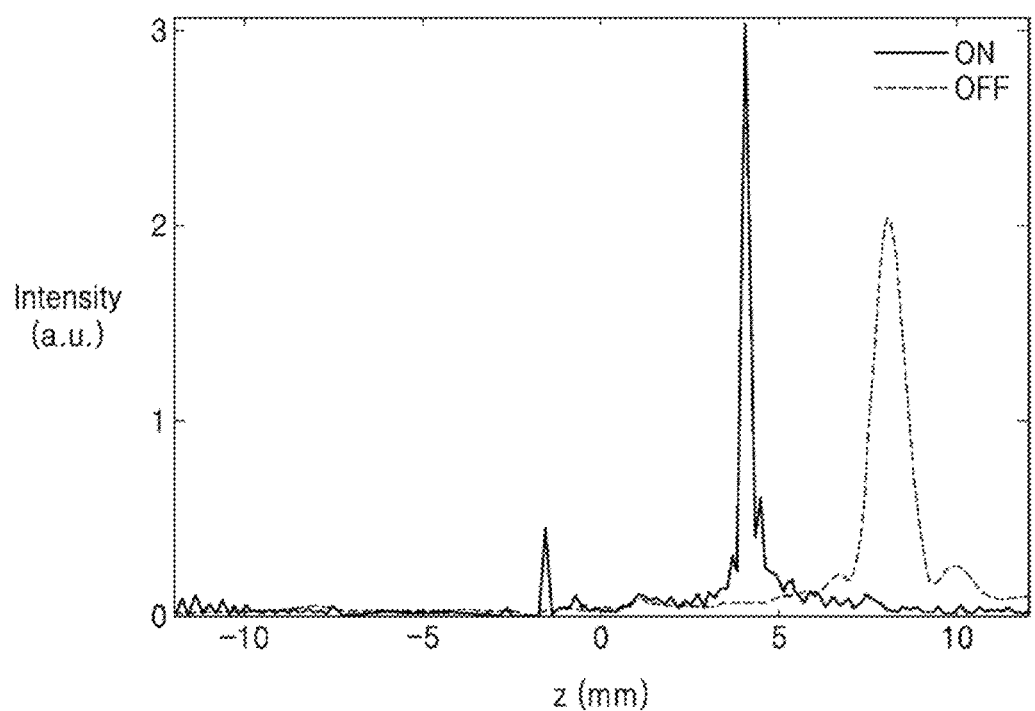
FIG. 12 is a graph showing a result of computer simulation of a focusing distribution of the meta-optical device of FIG. 11 according to a rotation state of liquid crystal molecules.

FIG. 11 is a conceptual diagram illustrating a schematic structure and a function of a meta-optical device 101 according to an embodiment, and FIG. 12 is a graph showing a result of computer simulation of a focusing distribution of the meta-optical device 101 of FIG. 11 according to a rotation state of the liquid crystal molecule.

The meta-optical device 101 is a bi-focal lens, and is different from the meta-optical device 100 described above in that a meta-surface layer 141 is set such that the focal length $f_{on}$ when the angle of rotation of the liquid crystal molecule is 90° is half of a focal length $f_{off}$ when the angle of rotation of the liquid crystal molecule is 0°.

The regions of the meta-surface layer 141 may be divided similarly as described in FIG. 7, and in setting the shapes of the nanostructures NS constituting the meta-surface layer 141 for each position, the nanostructures NS to be arranged in each sub-zone are selected by setting $f_{off}$ to 8 mm and $f_{on}$ to 4 mm and setting the number of sub-zones in each region to 5.

Referring to FIG. 12, it may be found that a peak of the intensity of light is at the position z=8 mm in an OFF state in which the angle of rotation of the liquid crystal molecule is 0°, and a peak of the intensity of light is at the position z=4 mm in an ON state in which the angle of rotation of the liquid crystal molecule is 90°, and it may also be found that intended two focal lengths are implemented.

Figure 13:
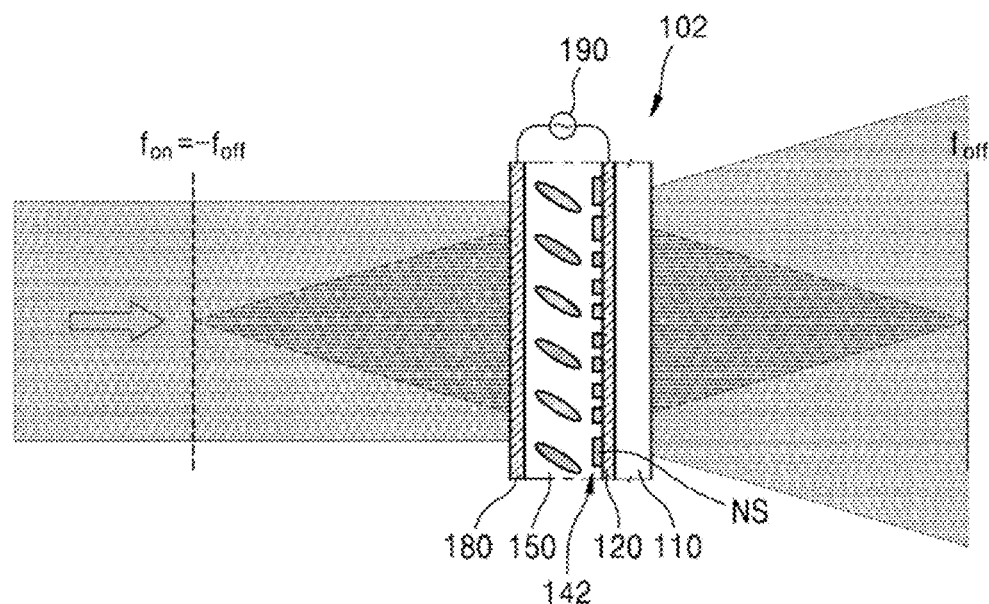
FIG. 13 is a conceptual diagram illustrating a schematic structure and a function of a meta-optical device according to an embodiment.
Figure 14:
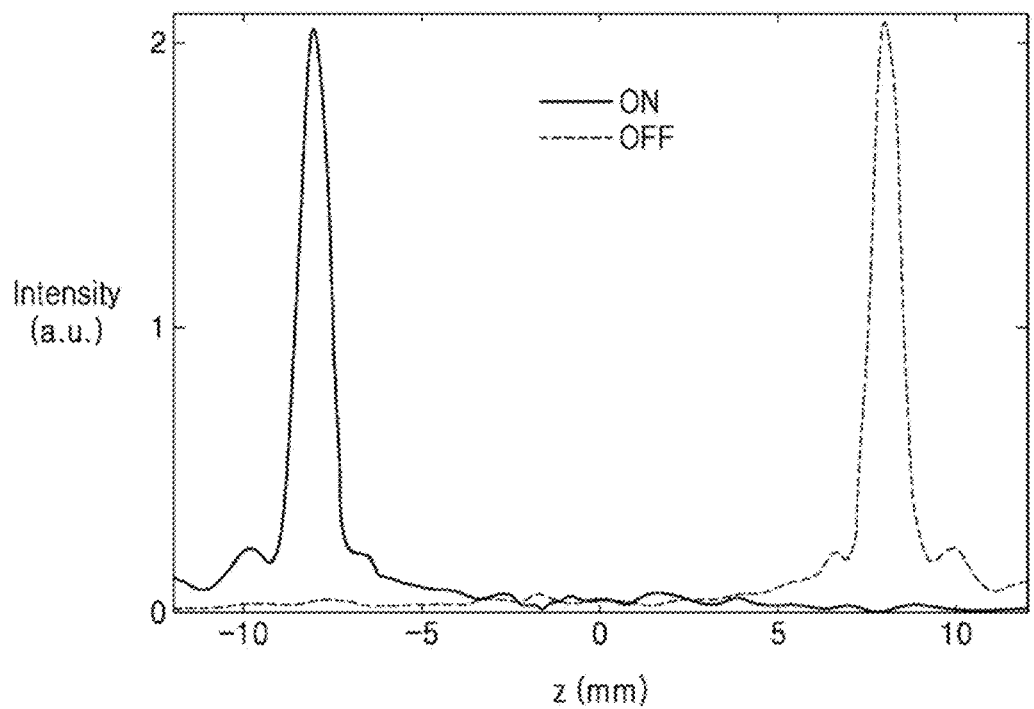
FIG. 14 is a graph showing a result of computer simulation of a focusing distribution of the meta-optical device of FIG. 13 according to a rotation state of liquid crystal molecules.

FIG. 13 is a conceptual diagram illustrating a schematic structure and a function of a meta-optical device 102 according to an embodiment. FIG. 14 is a graph showing a result of computer simulation of a focusing distribution of the meta-optical device 102 of FIG. 13 according to a rotation state of the liquid crystal molecule.

The meta-optical device 102 is a bi-focal lens, and is different from the meta-optical devices 100 and 101 described above in that a meta-surface layer 142 is set such that the focal length $f_{off}$ when the angle of rotation of the liquid crystal molecule is 0°, and a focal length $f_{on}$ when the angle of rotation of the liquid crystal molecule is 90° have a relationship of $f_{on}=-f_{off}$.

The regions of the meta-surface layer 142 may be divided similarly as described in FIG. 7, and in setting the shapes of the nanostructures NS constituting the meta-surface layer 142 for each position, the nanostructures NS to be arranged in each sub-zone are selected by setting $f_{off}$ to 8 mm and $f_{on}$ to −8 mm and setting the number of sub-zones in each region to 5.

Referring to FIG. 14, it may be found that a peak of the intensity of light is at the position z=8 mm in the OFF state in which the angle of rotation of the liquid crystal molecule is 0°, and a peak of the intensity of light is at the position z=−8 mm in the ON state in which the angle of rotation of the liquid crystal molecule is 90°, and it may also be found that intended two focal lengths are implemented.

The meta-optical devices 101 and 102 described with reference to FIGS. 11 to 14 have focusing efficiencies of 22% and 27% in the two states (the ON and OFF states), respectively, and the Strehl ratio representing the diffraction efficiency was calculated to be greater than 0.8 in both states. It may be evaluated as exhibiting near-diffraction limited focusing performance.

The meta-optical devices 101 and 102 described with reference to FIGS. 11 to 14, which serve as bi-focal lenses, may have a large numerical aperture, for example, greater than 0.3. In the computer-simulated example, the number of sub-zones in each region is illustrated as 5, but the disclosure is not limited thereto, and two focal lengths may be implemented even with a simple structure having three sub-zones in each region.

Figure 15:
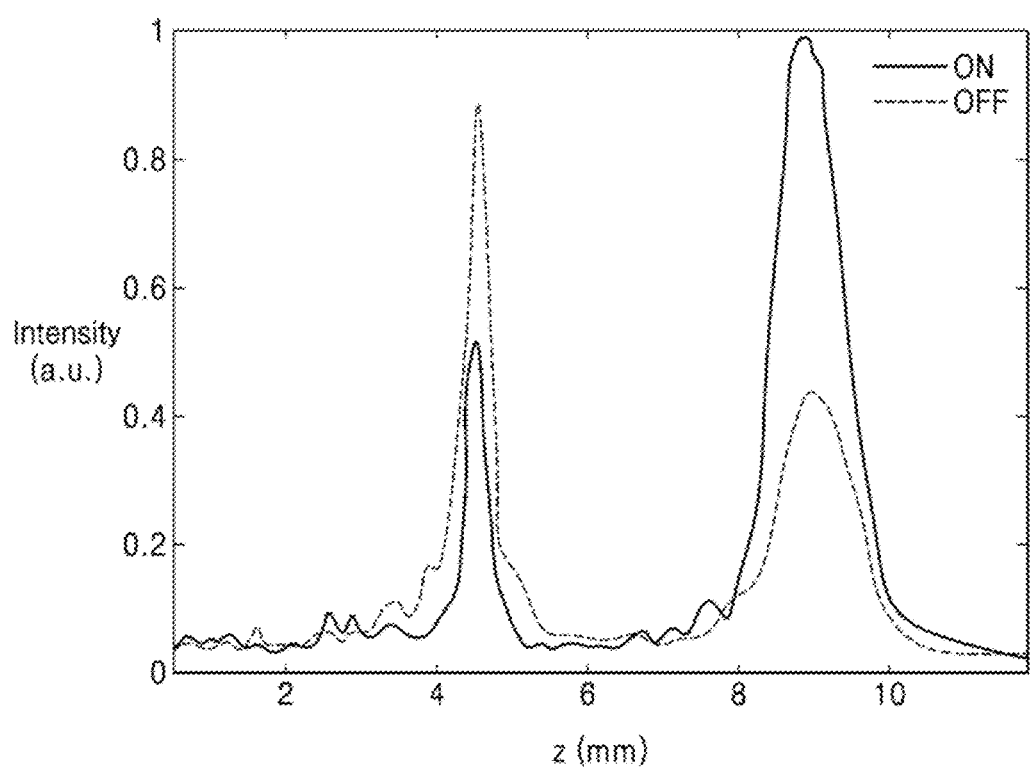
FIG. 15 is a graph showing a measured focusing distribution according to a rotation state of liquid crystal molecules of a fabricated meta-optical device according to an embodiment.

FIG. 15 is a graph showing a measured focusing distribution according to a rotation state of liquid crystal molecules of a fabricated meta-optical device according to an embodiment.

The inventor has fabricated and thus implemented the meta-optical device 101 that is switched between two focal lengths $f_{on}$ and $f_{off}$ satisfying $f_{on}=f_{off}/2$. For convenience of fabrication, each of the unit cells constituting the meta-surface layer 141 was set to be composed of one nanostructure NS, e.g., the variables in FIG. 4 were set such that Px=Py=P, W1=W, L1=L, and g=W2=L2=0. The fill factor of the nanostructure NS, that is, $$F = \frac{WL}{P^2}$$

was about 0.15 to about 0.45, the number of sub-zones was 4, the height of the nanostructure NS was 300 nm, and the center wavelength of incident light was 800 nm.

Referring to FIG. 15, it may be found that when the applied voltage is $V_0$=2.2 $V_{pp}$, which corresponds to the OFF state, a peak of the intensity of light is at the position z=9 mm, and when the applied voltage is $V_0$=9.8 $V_{pp}$, which corresponds to the ON state, a peak of the intensity of light is at the position z=4.5 mm. In addition, the Strehl ratio corresponding to the OFF state and the ON state were 0.75 and 0.84, respectively.

It has been described that the meta-optical devices according to the embodiments may function as a vari-focal lens having a variable focal length that continuously varies between 12 mm and 15 mm or as a bi-focal lens which is switched between two focal lengths of predefined requirements, by performing computer simulation and experiments. However, the variable focus that may be implemented by the meta-optical devices is not limited to the wavelength ranges or specific numerical values described above. Furthermore, in addition to the quadrangular prism described as an example of the shape of the nanostructures NS, an elliptical cylindrical shape may be employed in the nanostructures NS, for example, an elliptical cylinder having the direction of the major axis parallel to the first direction may be employed. In addition, a cylindrical shape or a regular polygonal prism shape may be employed in the nanostructures NS.

The above-described meta-optical devices having variable performance may be applied to various electronic devices. For example, the above-described meta-optical devices having variable focus performance may be used in a display device capable of expressing a variable depth, and an augmented reality device utilizing the display device. The meta-optical devices described above may be mounted in electronic devices such as smart phones, wearable devices, Internet of Things (IoT) devices, home appliances, tablet personal computers (tablet PCs), personal digital assistants (PDAs), portable multimedia players (PMPs), navigation devices, drones, advanced driver-assistance systems (ADASs), and the like.

Figure 16:
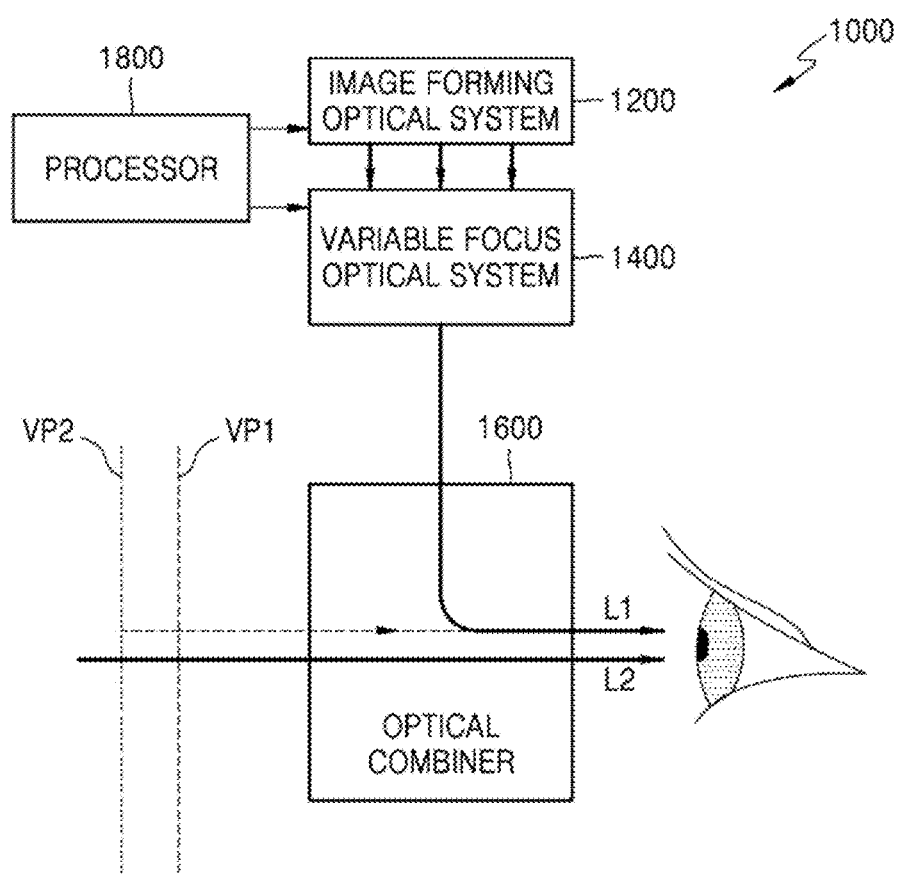
FIG. 16 is a conceptual diagram illustrating a schematic configuration of a display device according to an embodiment.

FIG. 16 is a conceptual diagram illustrating a schematic configuration of a display device 1000 according to an embodiment.

The display device 1000 may be a three-dimensional image display device capable of expressing a variable depth. The display device 1000 may include an image forming optical system 1200 configured to form an image by modulating light, and a variable focus optical system 1400 configured to adjust the position on which the image formed by the image forming optical system 1200 is focused. The variable focus optical system 1400 may include any one of the meta-optical devices 100, 101, and 102 capable of varying the focal length as described above, or a lens having a structure modified therefrom.

The display device 1000 may further include an optical combiner 1600 configured to combine image light L1 generated by the image forming optical system 1200 with ambient light L2 in front of an observer and provide the combined result to the observer. For example, the optical combiner 1600 may be configured to change a path of the image light L1 from the image forming optical system 1200 to be toward the observer, and to be transparent with respect to the ambient light L2 in front of the observer. The optical combiner 1600 may include, for example, a polarizing beam splitter or a half mirror, and a polarizer or a phase retarder. With the optical combiner 1600, the display device 1000 may be utilized as an augmented reality device that provides additional information as the image light L1 that may be added to a surrounding environment.

The display device 1000 may further include a processor 1800 configured to control the image forming optical system 1200 and the variable focus optical system 1400. For example, the processor 1800 may control the variable focus optical system 1400 to creating an appropriate sense of depth according to image information generated by the image forming optical system 1200.

The image forming optical system 1200 forms an image by modulating light according to three-dimensional image information to be displayed to the observer. Images formed by the image forming optical system 1200 may be, for example, stereo images provided to the left eye and the right eye of an observer, respectively. For convenience of illustration, only an optical system facing one eye is illustrated in the drawing. The images formed by the image forming optical system 1200 are not limited thereto, and may be hologram images, light-field images, integral photography (IP) images, or the like, and may include multi-view or super multi-view images.

The image forming optical system 1200 may include, for example, a display device such as a liquid crystal on silicon (LCoS) device, a liquid crystal display (LCD) device, an organic light emitting diode (OLED) display device, or a digital micromirror device (DMD), or may include a next-generation display device such as a micro LED or a quantum dot (QD) LED.

The image forming optical system 1200 may include a light source for providing light for forming an image, and may further include a beam splitter for adjusting an optical path, a relay lens for enlarging and reducing an image, a spatial filter for removing noise, and the like.

The variable focus optical system 1400 is for multi-depth expression. The variable focus optical system 1400 may include any one of the above-described meta-optical devices 100, 101, and 102 having the variable focus performance, or a lens having a structure modified therefrom, and may implement continuous variation of the focal length within a preset range, or a plurality of preset focal lengths. As the focal length is adjusted by the variable focus optical system 1400, the observer recognizes as if the image light L1 generated by the image forming optical system 1200 is emanating from virtual planes VP1 or VP2 at different depths. With such variable depth expression, a three-dimensional perception may be doubled and visual fatigue felt by the observer may be reduced. For example, even in the case of a stereoscopic scheme in which a three-dimensional image is recognized by using parallax of left and right eyes, by adding a scheme of varying the positions of virtual planes on which left- and right-eye images are focused according to depth information included in the image in addition to the parallax of left and right eyes, visual fatigue due to vergence-accommodation conflict, which generally occurs in the stereoscopic scheme, may be reduced.

The focal length adjustment of the variable focus optical system 1400 may be performed with reference to image information under the control by the processor 1800, and in this case, the focal length may be adjusted to express a plurality of depth positions with respect to an image of one frame, or may be adjusted to express one depth position for each image of one frame. The depth position may be set to continuously change within a preset range, or may be set to preset two positions, or another number of preset positions.

Figure 17:
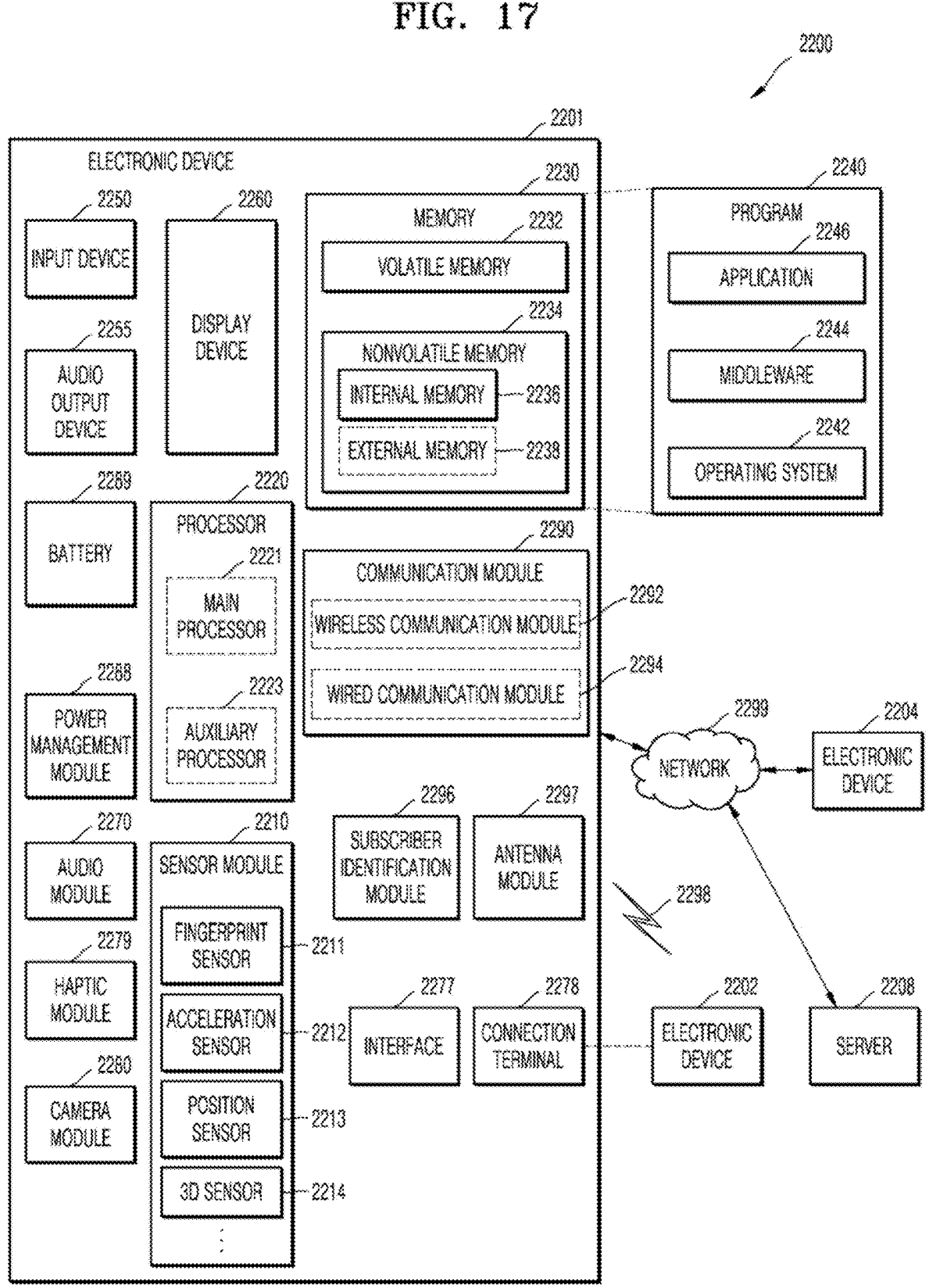
FIG. 17 is a block diagram illustrating a schematic configuration of an electronic device according to an embodiment.

FIG. 17 is a block diagram illustrating a schematic configuration of an electronic device 2201 within a network environment 2200.

Referring to FIG. 17, in the network environment 2200, the electronic device 2201 may communicate with another electronic device 2202 through a first network 2298 (e.g., a short-range wireless communication network, etc.), or may communicate with another electronic device 2204 and/or a server 2208 through a second network 2299 (e.g., a long-range wireless communication network, etc.). The electronic device 2201 may communicate with the electronic device 2204 through the server 2208. The electronic device 2201 may include a processor 2220, a memory 2230, an input device 2250, an audio output device 2255, a display device 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. In the electronic device 2201, some (e.g., the display device 2260, etc.) of these components may be omitted, or other components may be added. Some of these components may be implemented in one integrated circuit. For example, a fingerprint sensor 2211, an iris sensor, an illuminance sensor, or the like of the sensor module 2210 may be implemented by being embedded in the display device 2260 (e.g., a display, etc.).

The processor 2220 may execute software (e.g., a program 2240, etc.) to control one or more other components (e.g., hardware or software components, etc.) of the electronic device 2201 that are connected to the processor 2220, and may perform a variety of data processing or operations. As a portion of the data processing or operations, the processor 2220 may load instructions and/or data received from other components (e.g., the sensor module 2210, the communication module 2290, etc.) into a volatile memory 2232, may process instructions and/or data stored in the volatile memory 2232, and may store result data in a nonvolatile memory 2234. The processor 2220 may include a main processor 2221 (e.g., a central processing unit, an application processor, etc.) and an auxiliary processor 2223 (e.g., a graphics processing unit, an image signal processor, a sensor hub processor, a communication processor, etc.) that may be operated independently or together. The auxiliary processor 2223 uses less power than the main processor 2221 and may perform specialized functions.

The auxiliary processor 2223 may control functions and/or states related to some (e.g., the display device 2260, the sensor module 2210, the communication module 2290, etc.) of components of the electronic device 2201, on behalf of the main processor 2221 while the main processor 2221 is in inactive (e.g., sleep) state or with the main processor 2221 while the main processor 2221 is in an active (e.g., application execution) state. The auxiliary processor 2223 (e.g., an image signal processor, a communication processor, etc.) may be implemented as a portion of other functionally relevant components (e.g., the camera module 2280, the communication module 2290, etc.).

The memory 2230 may store a variety of data required by components (e.g., the processor 2220, the sensor module 2210, etc.) of the electronic device 2201. The data may include, for example, software (e.g., the program 2240, etc.) and input data and/or output data for commands related thereto. The memory 2230 may include the volatile memory 2232 and/or the nonvolatile memory 2234.

The program 2240 may be stored as software in the memory 2230, and may include an operating system 2242, middleware 2244, and/or an application 2246.

The input device 2250 may receive commands and/or data to be used for the components (e.g., the processor 2220, etc.) of the electronic device 2201 from the outside (e.g., a user, etc.) of the electronic device 2201. The input device 2250 may include a microphone, a mouse, a keyboard, and/or a digital pen (e.g., a stylus pen, etc.).

The audio output device 2255 may output an audio signal to the outside of the electronic device 2201. The audio output device 2255 may include a speaker and/or a receiver. The speaker may be used for general purposes such as multimedia playback or recording playback, and the receiver may be used to receive incoming calls. The receiver may be combined as a portion of the speaker or may be implemented as a separate device.

The display device 2260 may visually provide information to the outside of the electronic device 2201. The display device 2260 may include a display, a hologram device, or a projector, and a control circuit for controlling the device. The display device 2260 may include a touch circuitry configured to detect a touch, and/or a sensor circuit (e.g., a pressure sensor, etc.) configured to measure the intensity of force generated by the touch.

The audio module 2270 may convert sound into an electrical signal, or vice versa. The audio module 2270 may obtain sound through the input device 2250, or may output sound through the audio output device 2255 and/or speakers and/or headphones of another electronic device (e.g., an electronic device 2202, etc.) directly or wirelessly connected to the electronic device 2201.

The sensor module 2210 may detect an operating state (e.g., power, temperature, etc.) of the electronic device 2201 or an external environmental state (e.g., user status, etc.), and may generate an electrical signal and/or a data value corresponding to the detected state. The sensor module 2210 may include a fingerprint sensor 2211, an acceleration sensor 2212, a position sensor 2213, a three-dimensional (3D) sensor 2214, and the like, and may further include an iris sensor, a gyro sensor, a barometric sensor, a magnetic sensor, a grip sensor, a proximity sensor, a color sensor, an infrared (IR) sensor, a biometric sensor, a temperature sensor, a humidity sensor, and/or an illuminance sensor.

The 3D sensor 2214 may irradiate certain light to an object and analyze the light reflected from the object to sense the shape, a movement, or the like of the object.

The interface 2277 may support one or more designated protocols, which may be used to directly or wirelessly connect the electronic device 2201 with other electronic devices (e.g., the electronic device 2202, etc.). The interface 2277 may include a high definition multimedia interface (HDMI), a universal serial bus (USB) interface, a secure digital (SD) card interface, and/or an audio interface.

A connection terminal 2278 may include a connector through which the electronic device 2201 may be physically connected to other electronic devices (e.g., the electronic device 2202, etc.). The connection terminal 2278 may include an HDMI connector, a USB connector, an SD card connector, and/or an audio connector (e.g., a headphone connector, etc.).

The haptic module 2279 may convert electrical signals into a mechanical stimulus (e.g., vibration, movement, etc.) or an electrical stimulus that the user may perceive through tactile or motor sensations. The haptic module 2279 may include a motor, a piezoelectric element, and/or an electrical stimulation device.

The camera module 2280 may capture a still image and a moving image. The camera module 2280 may include a lens assembly including one or more lenses, image sensors, image signal processors, and/or flashes. The lens assembly included in the camera module 2280 may collect light emitted from an object to be image-captured, and may include any one of the meta-optical devices 100, 101, and 102 according to the embodiments described above or modifications thereof.

The power management module 2288 may manage power supplied to the electronic device 2201. The power management module 2288 may be implemented as a portion of a power management integrated circuit (PMIC).

The battery 2289 may supply power to components of the electronic device 2201. The battery 2289 may include a non-rechargeable primary battery, a rechargeable secondary battery, and/or a fuel cell.

The communication module 2290 may support establishment of a direct (e.g., wired) communication channel and/or a wireless communication channel between the electronic device 2201 and other electronic devices (e.g., the electronic device 2202, the electronic device 2204, the server 2208, etc.), and communication through the established communication channel. The communication module 2290 operates independently of the processor 2220 (e.g., an application processor, etc.) and may include one or more communication processors supporting direct communication and/or wireless communication. The communication module 2290 may include a wireless communication module 2292 (e.g., a cellular communication module, a short-range wireless communication module, a global navigation satellite system (GNSS) communication module, etc.) and/or a wired communication module 2294 (e.g., a local area network (LAN) communication module, a power line communication module, etc.). The corresponding communication module among these communication modules may communicate with other electronic devices through the first network 2298 (e.g., a local area network such as Bluetooth, WiFi Direct, or Infrared Data Association (IrDA)) or the second network 2299 (e.g., a telecommunication network such as a cellular network, the Internet, or computer networks (e.g., LAN, WAN, etc.)). These various types of communication modules may be integrated into a single component (e.g., a single chip, etc.) or may be implemented as a plurality of separate components (e.g., multiple chips). The wireless communication module 2292 may identify and authenticate the electronic device 2201 within a communication network such as the first network 2298 and/or the second network 2299 by using subscriber information (e.g., an international mobile subscriber identifier (IMSI), etc.) stored in the subscriber identification module 2296.

The antenna module 2297 may transmit and/or receive signals and/or power to and/or from the outside (e.g., other electronic devices, etc.). An antenna may include a radiator made of a conductive pattern formed on a substrate (e.g., a printed circuit board (PCB), etc.). The antenna module 2297 may include one or more antennas. When a plurality of antenna are included, the communication module 2290 may select an antenna suitable for a communication method used in a communication network, such as the first network 2298 and/or the second network 2299, among the plurality of antennas. Signals and/or power may be transmitted or received between the communication module 2290 and other electronic devices through the selected antenna. Other components (e.g., an radio-frequency integrated circuit (RFIC), etc.) in addition to the antenna may be included as a portion of the antenna module 2297.

Some of the components may be connected to each other and exchange signals (e.g., a command, data, etc.) through a communication method between peripheral devices (e.g., a bus, general purpose input and output (GPIO), a serial peripheral interface (SPI), a mobile industry processor interface (MIPI), etc.).

The command or data may be transmitted or received between the electronic device 2201 and the external electronic device 2204 through the server 2208 connected to the second network 2299. The types of the electronic devices 2202 and 2204 may be the same as or different from that of the electronic device 2201. All or some of the operations executed in the electronic device 2201 may be executed in one or more of the electronic devices 2202 and 2204, and the server 2208. For example, when the electronic device 2201 needs to perform certain functions or services, the electronic device 2201 may request one or more other electronic devices to perform some or all of the functions or services instead of directly executing the functions or services. One or more other electronic devices that have received the request may execute an additional function or service related to the request, and may transfer a result of the execution to the electronic device 2201. To this end, cloud computing, distributed computing, and/or client-server computing technologies may be used.

Figure 18:
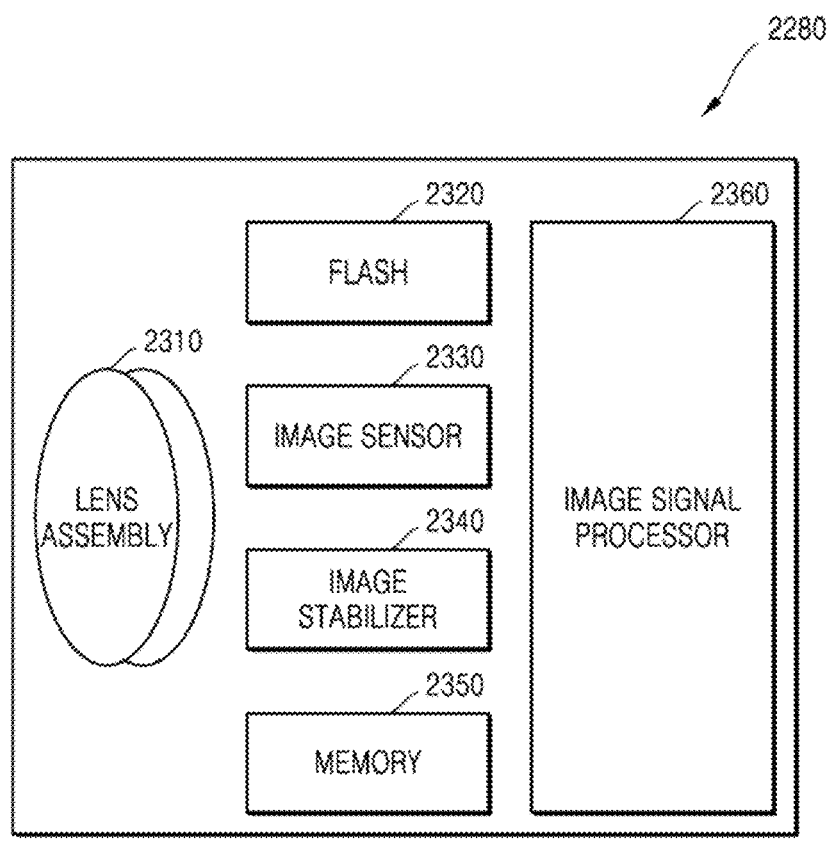
FIG. 18 is a block diagram illustrating a schematic configuration of a camera module included in the electronic device of FIG. 17.

FIG. 18 is a block diagram illustrating an example schematic configuration of the camera module 2280 included in the electronic device 2201 of FIG. 17.

Referring to FIG. 18, the camera module 2280 may include a lens assembly 2310, a flash 2320, an image sensor 2330, an image stabilizer 2340, a memory 2350 (e.g., a buffer memory, etc.), and/or an image signal processor 2360. The lens assembly 2310 may collect light emitted from an object to be image-captured, and may include one or more refractive lenses, and any one of the meta-optical devices 100, 101, and 102 having the variable focus performance, or a meta-optical device of a modification thereof. The meta-optical device included in the lens assembly 2310 may be designed to exhibit a focal length that continuously varies within a preset range, or a plurality of preset focal lengths. The lens assembly 2310 including the meta-optical device may realize desired optical performance (a focal length) and may have a short total optical length.

The camera module 2280 may further include an actuator. The actuator may drive the positions of lens elements constituting the lens assembly 2310 and adjust a separation distance between the lens elements, for example, for zooming and/or auto-focusing (AF)

The camera module 2280 may include a plurality of lens assemblies 2310, and in this case, the camera module 2280 may be a dual camera, a 360-degree camera, or a spherical camera. Some of the plurality of lens assemblies 2310 may have the same lens attributes (e.g., an angle of view, a focal length, autofocus, F Number, optical zoom, etc.) or different lens attributes. The lens assembly 2310 may include a wide-angle lens or a telephoto lens.

The flash 2320 may emit light used to enhance light emitted or reflected from an object. The flash 2320 may include one or more light-emitting diodes (e.g., red-green-blue (RGB) LEDs, white LEDs, infrared LEDs, ultraviolet LEDs, etc.), and/or a xenon lamp. The image sensor 2330 may obtain an image corresponding to an object by converting light emitted or reflected from the object and transmitted through the lens assembly 2310 into an electrical signal. The image sensor 2330 may include one or more sensors selected from image sensors having different attributes, such as an RGB sensor, a black and white (BW) sensor, an IR sensor, or a UV sensor. Each of the sensors included in the image sensor 2330 may be implemented, for example, as a charged coupled device (CCD) sensor and/or a complementary metal oxide semiconductor (CMOS) sensor.

The image stabilizer 2340 may move one or more lenses or the image sensor 2330 included in the lens assembly 2310 in a specific direction in response to movement of the camera module 2280 or an electronic device 2201 including the same, or may control an operating characteristic of the image sensor 2330 (e.g., adjustment of read-out timing, etc.) such that a negative effect due to movement is compensated for. The image stabilizer 2340 may detect movement of the camera module 2280 or the electronic device 2201 by using a gyro sensor or an acceleration sensor arranged inside or outside the camera module 2280. The image stabilizer 2340 may be implemented optically.

In the memory 2350, some or all of the data obtained through the image sensor 2330 may be stored for the next image processing operation. For example, when a plurality of images are obtained at high speed, the obtained original data (e.g., Bayer-patterned data, high-resolution data, etc.) may be stored in the memory 2350 and only a low-resolution image is displayed, and then the original data of a selected image (e.g., by a user selection, etc.) may be transmitted to the image signal processor 2360. The memory 2350 may be integrated into the memory 2230 of the electronic device 2201 or may be configured as a separate memory that operates independently.

The image signal processor 2360 may perform one or more image processes on an image obtained through the image sensor 2330 or image data stored in the memory 2350. The one or more image processes may include depth map generation, three-dimensional modeling, panorama generation, feature point extraction, image synthesis, and/or image compensation (e.g., noise reduction, resolution adjustment, brightness adjustment, blurring, sharpening, softening, etc.). The image signal processor 2360 may perform control (e.g., exposure time control, or read-out timing control, etc.) of components (e.g., the image sensor 2330, etc.) included in the camera module 2280. An image processed by the image signal processor 2360 may be stored again in the memory 2350 for further processing or may be provided to external components (e.g., the memory 2230, the display device 2260, the electronic device 2202, the electronic device 2204, the server 2208, etc.) of the camera module 2280. The image signal processor 2360 may be integrated into the processor 2220 or may be configured as a separate processor that operates independently of the processor 2220. When the image signal processor 2360 is configured as a processor separate from the processor 2220, an image processed by the image signal processor 2360 may be displayed through the display device 2260 after further image processing by the processor 2220.

The electronic device 2201 may include a plurality of camera modules 2280 having respective different attributes or functions. In this case, one of the plurality of camera modules 2280 may be a wide-angle camera, and the other may be a telephoto camera. Similarly, one of the plurality of camera modules 2280 may be a front camera, and the other may be a rear camera.

The meta-optical device described above may implement an electrically controlled variable focal length.

The meta-optical device described above may exhibit a focal length that gradually varies within a preset range, or may be switched between two focal lengths.

The meta-optical device described above may be employed in various electronic devices utilizing a variable focus lens function.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A meta-optical device which imparts a phase delay to incident light of a wavelength band, the meta-optical device comprising:
   a first electrode and a second electrode spaced apart from each other;
   a liquid crystal layer between the first electrode and the second electrode;
   a meta-surface layer located within the liquid crystal layer, the meta-surface layer comprising a plurality of nanostructures each having a shape dimension smaller than a center wavelength of the wavelength band; and a voltage device configured to apply a voltage between the first electrode and the second electrode, wherein the meta-surface layer comprises a plurality of unit cells, and wherein each of the plurality of unit cells comprises a pair of a first nanostructure of the plurality of nanostructures and a second nanostructure of the plurality of nanostructures, wherein the first nanostructure has different dimensions from the second nanostructure.

2. The meta-optical device of claim 1,
wherein an angle between a major axis of liquid crystal molecules in the liquid crystal layer and a first direction parallel to the meta-surface layer increases according to the voltage applied between the first electrode and the second electrode.

3. The meta-optical device of claim 2,
wherein the meta-optical device exhibits a first focal length when the angle is 0°, and exhibits a second focal length shorter than the first focal length, when the angle is 90°.

4. The meta-optical device of claim 3,
wherein the meta-optical device exhibits a third focal length shorter than the first focal length and longer than the second focal length, when the angle is between 0° and 90°.

5. The meta-optical device of claim 2,
wherein a focal length of the meta-optical device is gradually reduced as the angle increases from 0° up to 90°.

6. The meta-optical device of claim 2,
wherein a phase φ of the meta-optical device for each of angles 0°, $\theta_1$, $\theta_2$, $\theta_3$, and 90° between the major axis of the liquid crystal molecules and the first direction, satisfies the following condition:

$\varphi(90°) < \varphi(\theta_3) < \varphi(\theta_2) < \varphi(\theta_1) < \varphi(0°)$ (here, $0° < \theta_1 < \theta_2 < \theta_3 < 90°$).

7. The meta-optical device of claim 6,
wherein the meta-optical device satisfies the following condition:

$\Phi < 1.5$ radian (here, $\Phi$ is defined as follows:)

$$\Phi = \sum_{i=1}^{4} \frac{|\Delta\Phi_i - \text{mean}(\Delta\Phi_i)|}{4}$$

$\Delta\Phi_1 = \phi(90°) - \phi(67°), \Delta\Phi_2 = \phi(67°) - \phi(45°)$ $\Delta\Phi_3 = \phi(45°) - \phi(22°), \Delta\Phi_4 = \phi(22°) - \phi(0°)$.

8. The meta-optical device of claim 2,
wherein each of the plurality of nanostructures comprises a quadrangular prism in which at least one side is parallel to the first direction.

9. The meta-optical device of claim 1,
wherein when viewed from a cross-section parallel to the meta-surface layer, the first nanostructure and the second nanostructure each have a rectangular shape having a width parallel to the first direction and a length parallel to a second direction perpendicular to the first direction.

10. The meta-optical device of claim 2,
wherein a focal length is f1 when the angle is 0°, and
wherein the focal length is f1/2 when the angle is 90°.

11. The meta-optical device of claim 2,
wherein a focal length is f1 when the angle is 0°, and
wherein the focal length is −f1 when the angle is 90°.

12. The meta-optical device of claim 1,
wherein the meta-surface layer comprises a plurality of phase modulation regions,
wherein a phase modulation range of each phase modulation region of the plurality of phase modulation regions is equal to the phase modulation range of each other phase modulation region of the plurality of phase modulation regions, and
wherein each of the plurality of phase modulation regions comprises a plurality of sub-zones.

13. The meta-optical device of claim 12,
wherein the phase modulation range is $2\pi$,
wherein a number of the plurality of sub-zones in each of the plurality of phase modulation regions is n, and
wherein a phase modulation interval of each of the plurality of sub-zones is $2\pi/n$.

14. The meta-optical device of claim 13,
wherein each of the plurality of sub-zones comprises at least one nanostructure having a shape dimension unique to the corresponding sub-zone.

15. The meta-optical device of claim 1,
wherein a height of each of the plurality of nanostructures is in a range of about $0.4\lambda_0$ to about $1.5\lambda_2$, where the center wavelength of the wavelength band is $\lambda_0$.

16. The meta-optical device of claim 1,
wherein a numerical aperture of the meta-optical device is greater than 0.3.

17. The meta-optical device of claim 1,
wherein the plurality of nanostructures comprises a material having a refractive index greater than a refractive index of the liquid crystal layer.

18. The meta-optical device of claim 1,
wherein the plurality of nanostructures comprises amorphous silicon (a-Si), crystalline silicon (c-Si), GaP, or $TiO_2$.

19. The meta-optical device of claim 1,
wherein the wavelength band comprises an infrared wavelength band or a visible wavelength band.

20. The meta-optical device of claim 1,
wherein each of the plurality of nanostructures has a polygonal prism shape, a circular cylindrical shape, or an elliptical cylindrical shape.

21. An electronic device comprising:
an image forming optical system; and
a variable focus optical system configured to adjust a position on which image light generated by the image forming optical system is focused, the variable focus optical system comprising the meta-optical device of claim 1.

22. The electronic device of claim 21, further comprising an optical combiner configured to combine ambient light with the image light and provide the combined light to a user.

23. An electronic device comprising:
an imaging lens assembly comprising the meta-optical device of claim 1; and
an image sensor configured to convert an optical image formed by the imaging lens assembly into an electrical signal.

24. The meta optical device of claim 1, wherein each unit cell of the plurality unit cells share a common first electrode and second electrode, and the first nanostructure and the second nanostructure are disposed within the common first electrode and second electrode.

\* \* \* \* \*